UNITED STATES PATENT OFFICE.

WILLIAM MORRISON, OF DES MOINES, IOWA, ASSIGNOR TO VESTA ACCUMULATOR COMPANY, OF CHICAGO, ILLINOIS, A CORPORATION OF ILLINOIS.

BINOXID-OF-HYDROGEN ELECTRODE.

1,006,774.     Specification of Letters Patent.     Patented Oct. 24, 1911.

No Drawing.     Application filed November 29, 1909. Serial No. 530,333.

*To all whom it may concern:*

Be it known that I, WILLIAM MORRISON, a citizen of the United States of America, and resident of Des Moines, Iowa, have invented a certain new and useful Improvement in Binoxid-of-Hydrogen Electrodes, of which the following is a specification.

My invention relates to improvements in negative electrodes, or positive pole plates for acid batteries, and has for its object the production of a plate in which the active material is thoroughly bonded in place and a hard and durable plate formed.

A further object is the production of a plate that will retain its red color during the bonding, and one in which no white sulfate will be formed.

A further object is the production of a plate by treatment with a solution of binoxid of hydrogen in the presence of an alkali such as ammonia. It is a known fact that binoxid of hydrogen possesses the peculiar property of acting as a reducing agent in the presence of an acid and as an oxidizing agent in the presence of an alkali. It is for that reason that I find it essential to use together with the binoxid of hydrogen an alkali, such as ammonia.

A further object is the production of a cheap and efficient plate.

These and such other objects as may hereinafter appear are attained by my invention, which is described in the following specification.

It is well known that great difficulty is experienced in the operation of acid batteries by reason of the formation of a white sulfate, occasioning a great loss of efficiency and considerably shortening the effective life of the battery.

In the production of my improved electrode I prefer to use the following method: I take a solution of sulfate of ammonia— preferably saturated to 35 on the acidometer—and to every five gallons add two pounds of binoxid of hydrogen of a ten-volume solution. I then take battery paste— preferably formed from two parts of red lead to one part of litharge—and thoroughly mix it with the solution. This mixture is then applied to any ordinary grid in the same manner as other paste, and the plate set away to dry. When the paste is thoroughly dry, I dip it in a solution consisting of distilled water to which has been added half a pound of binoxid of hydrogen of ten-volume solution to each gallon of water. The plate is allowed to dry, and is then dipped into a solution of dilute sulfuric acid, preferably of a specific gravity of about 1.110 containing about two pounds of binoxid of hydrogen of ten-volume solution to each five gallons. The battery is then made up without allowing the plates to dry after the last immersion, and while the pores of the active material are filled with the acid.

When the solution of sulfate of ammonia and binoxid of hydrogen is mixed with the oxid of lead, free ammonia is liberated, which escapes into the air, and the sulfuric acid radical of the ammonium sulfate combines with the lead, forming a sulfate which bonds the oxid but does not form a white sulfate. When the plate is dried, most or all of the ammonia has been given off and the sulfate acts as a bond, making a hard and durable plate. I find, however, that a little ammonia sulfate is often left in the plate, and prefer to dip the plate in the binoxid of hydrogen and water solution and permit it to thoroughly dry again. This operation removes all the ammonia, and binds the material more firmly together and gives greater durability to the plate. When the plate is dipped in the acid solution a little more sulfate is formed, and the pores of the plate are full of the acid conductor and in such shape as not to allow the formation of white sulfate.

In the first dipping, the binoxid of hydrogen acts as an oxidizer in the presence of ammonia, and prevents the formation of white sulfate, and the ammonia is more completely broken up. The object of the binoxid of hydrogen acid dip is to prevent the white sulfate from forming during the first charge in the formation of the plate, before the lead commences turning into an oxid, or during the process in which it is being converted into the peroxid of lead, and the formation should follow as soon as possible after this dip.

The presence of the binoxid of hydrogen in the pores completely prevents the formation of the white sulfate during the setting of the plate and also during the forming thereof. When sufficient binoxid of hydrogen has been used, the plate will retain the red color of the lead during the setting, and if such color is not maintained, it is an indication that an insufficient amount of binoxid of hydrogen has been used, and more binoxid of hydrogen should be added to the solution. It may also be an advantage to give more than a single dip in certain cases.

While I have indicated above definite proportions and relative strengths of solutions and chemicals employed, it is, of course, to be understood that I do not thereby limit myself to such proportions and strengths, but may vary them as desired to accommodate existing conditions, the only essential feature of my invention being the use of binoxid of hydrogen in the formation of a filled or pasted positive plate for use in an acid battery.

I claim:

1. The process of making negative electrodes or positive pole plates, which consists in first adding to a solution of sulfate of ammonia a suitable quantity of binoxid of hydrogen, then mixing with this solution suitable material to become active and then applying the paste so formed to a support or grid.

2. The process of making negative electrodes or positive pole plates, which consists in mixing suitable material to become active with a solution of sulfate of ammonia and binoxid of hydrogen, applying the paste so formed to a support or grid, permitting said paste to dry, and then dipping said electrode into a dilute solution of binoxid of hydrogen.

3. The process of making negative electrodes or positive pole plates, which consists in mixing suitable material to become active with a suitable solution for binding and binoxid of hydrogen, applying the paste so formed to a support or grid, permitting said paste to dry, and then dipping said electrode into a dilute solution of binoxid of hydrogen.

4. The process of making negative electrodes or positive pole plates, which consists in mixing suitable material to become active with a solution of sulfate of ammonia and binoxid of hydrogen, applying the paste so formed to a support or grid, permitting said paste to dry, then dipping said electrode into a dilute solution of binoxid of hydrogen, again permitting the electrode to dry and then dipping it in a solution of dilute sulfuric acid and binoxid of hydrogen.

5. The process of making negative electrodes or positive pole plates, which consists in mixing suitable material to become active with a suitable solution for binding and binoxid of hydrogen, applying the paste so formed to a support or grid, permitting said paste to dry, then dipping said electrode into a dilute solution of binoxid of hydrogen, again permitting the electrode to dry and then dipping it in a solution of dilute sulfuric acid and binoxid of hydrogen.

6. The process of making negative electrodes or positive pole plates, which consists in making a paste by mixing two parts of red lead and one part of litharge in a solution of sulfate of ammonia and binoxid of hydrogen, placing the paste so formed in a suitable support or grid, permitting said plate to dry, then dipping it one or more times in a solution of distilled water containing binoxid of hydrogen, permitting the plate to dry after each dipping, and then dipping said plate in a dilute solution of sulfuric acid containing binoxid of hydrogen.

7. The process of making negative electrodes or positive pole plates, which consists in making a paste by mixing two parts of red lead and one part of litharge in a suitable solution for binding and binoxid of hydrogen, placing the paste so formed in a suitable support or grid, permitting said plate to dry, then dipping it one or more times in a solution of distilled water containing binoxid of hydrogen, permitting the plate to dry after each dipping, and then dipping said plate in a dilute solution of sulfuric acid containing binoxid of hydrogen.

8. The process of making negative electrodes or positive pole plates, which consists in mixing suitable material to become active with a solution of sulfate of ammonia and binoxid of hydrogen, applying the paste so formed to a support or grid, permitting said paste to dry, and then dipping said electrode into a dilute solution of binoxid of hydrogen, permitting said electrode to dry and dipping a second time in the same solution, and again permitting the electrode to dry and then dipping it in a solution of dilute sulfuric acid and binoxid of hydrogen.

9. The process of making negative electrodes or positive pole plates, which consists in mixing suitable material to become active with a suitable solution for binding and binoxid of hydrogen, applying the paste so formed to a support or grid, permitting said paste to dry, and then dipping said electrode into a dilute solution of binoxid of hydrogen, permitting said electrode to dry and dipping a second time in the same solution, and again permitting the electrode to dry and then dipping it in a solution of dilute sulfuric acid and binoxid of hydrogen.

Signed by me at Chicago, Illinois, this 27th day of November 1909.

WILLIAM MORRISON.

Witnesses:
WM. B. DURNION,
E. H. CLEGG.

Copies of this patent may be obtained for five cents each, by addressing the "Commissioner of Patents, Washington, D. C."